H. H. HUNT.
TRAIN SIGNALING AND BRAKE RELEASING MECHANISM.
APPLICATION FILED MAR. 30, 1908.
959,749.
Patented May 31, 1910.
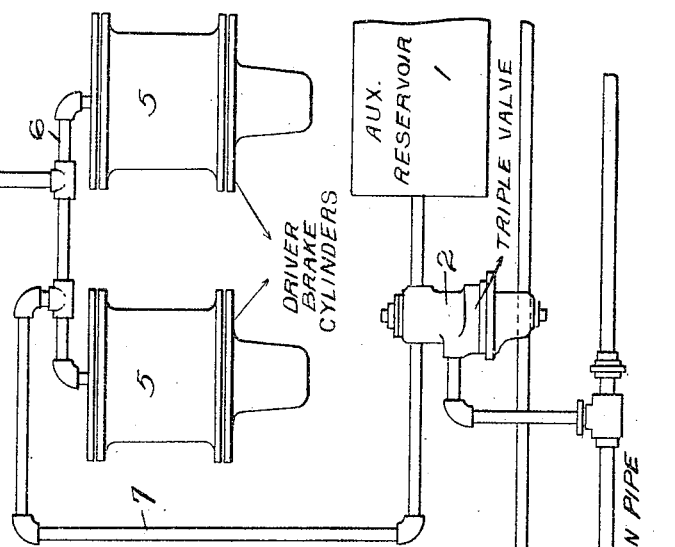
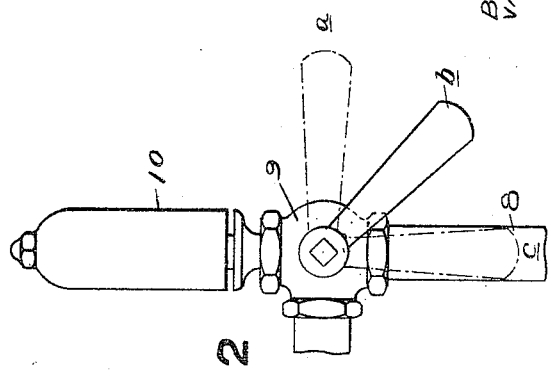
WITNESSES.
INVENTOR.
Harry H. Hunt,
by Edward A. Lawrance,
his attorney.

UNITED STATES PATENT OFFICE.

HARRY H. HUNT, OF WINFIELD TOWNSHIP, BUTLER COUNTY, PENNSYLVANIA.

TRAIN-SIGNALING AND BRAKE-RELEASING MECHANISM.

959,749.  Specification of Letters Patent.  Patented May 31, 1910.

Application filed March 30, 1908. Serial No. 423,999.

*To all whom it may concern:*

Be it known that I, HARRY H. HUNT, a citizen of the United States, and residing in the township of Winfield, in the county of Butler and State of Pennsylvania, have invented or discovered new and useful Improvements in Train-Signaling and Brake-Releasing Mechanism, of which the following is a specification.

My invention consists of new and useful improvements in signaling apparatus for freight trains and similar purposes, and, also, in driving wheel brake releasing means operatable therewith. When a long train is standing, as at a water tank, and the engineer is ready to start, he sounds the signal on the steam whistle to recall the rear flagman. The flagman returns to the train as quickly as possible and a go-ahead signal is then given to the engineer on the locomotive. This signal is usually given in the day time by waving the arm and at night by means of a lantern. In case the train is standing on a curve, or when the weather is foggy or thick, such a signal cannot be seen by the engineer and must be repeated over and over again before the train can be started. In the meantime the rear of the standing train is unprotected and a rear end collision may result. Several forms of signaling mechanisms have been tried in the past but none have proven satisfactory nor have they been put into general use, and at the present time hand signals are exclusively used in freight traffic. I provide a signal mechanism whereby by reducing the pressure in the train line pipe of the air brake mechanism, by means of a reduction valve in the caboose or at the rear end of the train, a whistle is sounded in the locomotive cab adjacent to the engineer's seat. The reducing valve in the caboose is connected by a pipe with the train line pipe and the whistle in the cab is connected by a pipe with the pipe connecting the driving wheel brake cylinders with the auxiliary reservoir, so that a reduction of pressure in the train line pipe by means of the conductor's reducing valve in the caboose will result in admitting pressure from the auxiliary reservoir through the triple valve to the whistle. In the pipe on which the whistle is mounted in the cab I provide a three-way cock which may be adjusted to close the passage of pressure or may be opened to admit pressure to the whistle to sound the same, or, again may be opened to atmosphere to relieve the pressure in the driving wheel brake cylinders without sounding the whistle.

The purpose of providing means for relieving the pressure in the driving wheel brake cylinders without sounding the whistle is as follows. When the brakes are thrown on suddenly as in case of an emergency stop, the driving wheels frequently become "locked" and slide, wearing a flat place in the tires which requires the retirement of the locomotive from service for repairs. When a locomotive is fitted with my signaling apparatus and the driving wheels begin to slide, the engineer throws the three-way cock in the whistle pipe to its position open to atmosphere, thus relieving the pressure in the driving wheel brake cylinders, releasing said brakes and permitting the driving wheels to revolve freely without sliding. This operation, as will be evident, does not release the brakes on the remainder of the train so that while the locomotive driving wheels are free to revolve, the rest of the train is still braked.

In the accompanying drawings, Figure 1 is a diagrammatic view showing my invention applied to a locomotive and a caboose, any number of intervening cars being supposed to make up the train, and Fig. 2 is an enlarged detail of the whistle and the three-way cock.

The following is a detailed description of the drawings.

1 is the auxiliary reservoir of a locomotive, 2 the triple valve, 3 the train line pipe running the length of the train, 4 the engineer's brake valve, 5—5 the locomotive driving wheel brake cylinders, 6 the pipe connecting the same and 7 the pipe connecting said pipe 6 with the triple valve 2 and the reservoir 1. These portions of the apparatus are simply the ordinary air brake mechanism in general use and are connected up in the usual manner.

8 is a pipe leading upwardly within the locomotive cab from the pipe 6, or if desired from the pipe 7. Fitted to said pipe 8 is a three-way cock 9 and superimposed on said cock is the air whistle 10. This construction is more clearly shown in Fig. 2. When the lever of the cock 9 is in the position marked *a* in Fig. 2, the passage through the pipe 8 is closed absolutely. When said lever is in the position marked *b* the cock is open through the whistle 10, and when the lever is in the position marked c the said cock is open to atmosphere through its lateral port. Thus when said cock is in the position a no pressure can escape through pipe 8 from the driving wheel brake cylinders or from pipe 6. When said cock is in position b the pressure in pipe 8 will escape through whistle 10 and sound the signal. When said cock is in position c the pressure in pipe 8 will escape through the lateral port in said cock without sounding whistle 10.

11 is a pipe in the caboose or rear of the train leading upwardly from the train line pipe 3 and having fitted to its upper end a cock 12.

It is evident that if the conductor or other trainman opens the cock 12 in the caboose, the pressure in the train line pipe 3 will be reduced, thus operating the triple valve 2 to admit pressure into the driving wheel brake cylinders 5—5 through the pipes 7 and 6. Now, if the three-way cock 9 be in position b the pressure in pipe 6 will pass up through pipe 8 and sound the whistle 10, thus giving the engineer the go-ahead signal. The engineer now turns cock 9 to position a and releases the train brakes by means of brake valve 4 and starts the train. The three-way cock 9 is normally kept at its closed position, a, so as not to interfere with the operation of the driving wheel brakes.

When, in case the brakes have been applied to a moving train, the driving wheels become locked and begin to slide, thus tending to wear the tires flat, the engineer simply turns said three-way cock 9 to position c open to atmosphere whereby the pressure in the driving wheel brake cylinders is relieved through pipe 8 thus releasing the driving wheel brakes but not affecting the rest of the train brakes. Thus, while the train brakes are still applied, the driving wheels are unbraked and free to revolve without danger of being flattened. When the danger of sliding is past, the three-way cock 9 is again closed and the driving wheel brakes may again be operated in connection with the rest of the train brakes in the usual manner.

It is evident that my signal may be used for many different purposes to which it is adapted. Thus, for instance, in case a train is being made up by introducing or cutting in a car, by opening the three-way cock in the cab the engineer can immediately discover whether or not the train line has been left uncoupled and open to atmosphere as in such case the reduction of pressure in the train line pipe would operate the triple valve and blow the whistle 10 when the three-way cock 9 is thrown into the proper position.

What I desire to claim is:—

1. In train signals adapted to be operated in connection with the air brakes, a pipe connected to the driving wheels brake cylinder pipe on the locomotive, a three-way cock on said pipe, a whistle attached to said three-way cock within the cab and a reducing cock in the caboose for reducing the pressure in the train line pipe whereby pressure is admitted from the auxiliary reservoir on the locomotive through the triple valve to said cylinder pipe for the purposes described.

2. In train signals adapted to be operated in connection with the air brakes, a pipe connected to the pipe delivering pressure from the auxiliary reservoir on the locomotive to the driving wheels brake cylinders, a three-way cock on said first mentioned pipe and a whistle connecting with said cock within the cab, a pipe leading from the train line pipe and a reducing cock thereon in the caboose whereby the pressure in the train line pipe is reduced and pressure admitted to said whistle from the auxiliary reservoir through the triple valve when said three-way cock is open through the whistle.

3. In driving wheel brake releasing and signal sounding apparatus operatable in connection with the air brakes, a pipe operatively connected with the driving wheel brake cylinders, a three-way cock in said pipe, a whistle connecting with said pipe and a reducing cock attached to the train line, whereby when said three-way cock is open through the whistle the reduction of pressure in the train line pipe by means of said reducing cock sounds said whistle and the opening of said three-way cock to atmosphere when the brakes are applied releases the driving wheel brakes without affecting the remaining train brakes, for the purposes described.

4. The combination with a fluid pressure brake apparatus, of a pipe on the locomotive connected to the pipe delivering pressure from the auxiliary reservoir on the locomotive to the driving wheels brake cylinders and normally relieved of pressure when the pressure in the train pipe is constant, a signal device connected with said first mentioned pipe and means whereby a reduction of pressure in said train pipe admits pressure to said first mentioned pipe and sounds said signal.

Signed at West Winfield, Pa., this 24th day of March, 1908.

HARRY H. HUNT.

Witnesses:
CHAS. CASTERLINE,
H. E. SHEARER.